June 12, 1923.

J. W. MILLER

TIRE

Filed Dec. 9, 1922

J. W. Miller
INVENTOR

BY Victor J. Evans
ATTORNEY

WITNESSES

June 12, 1923.
J. W. MILLER
TIRE
Filed Dec. 9, 1922
1,458,662
2 Sheets-Sheet 2
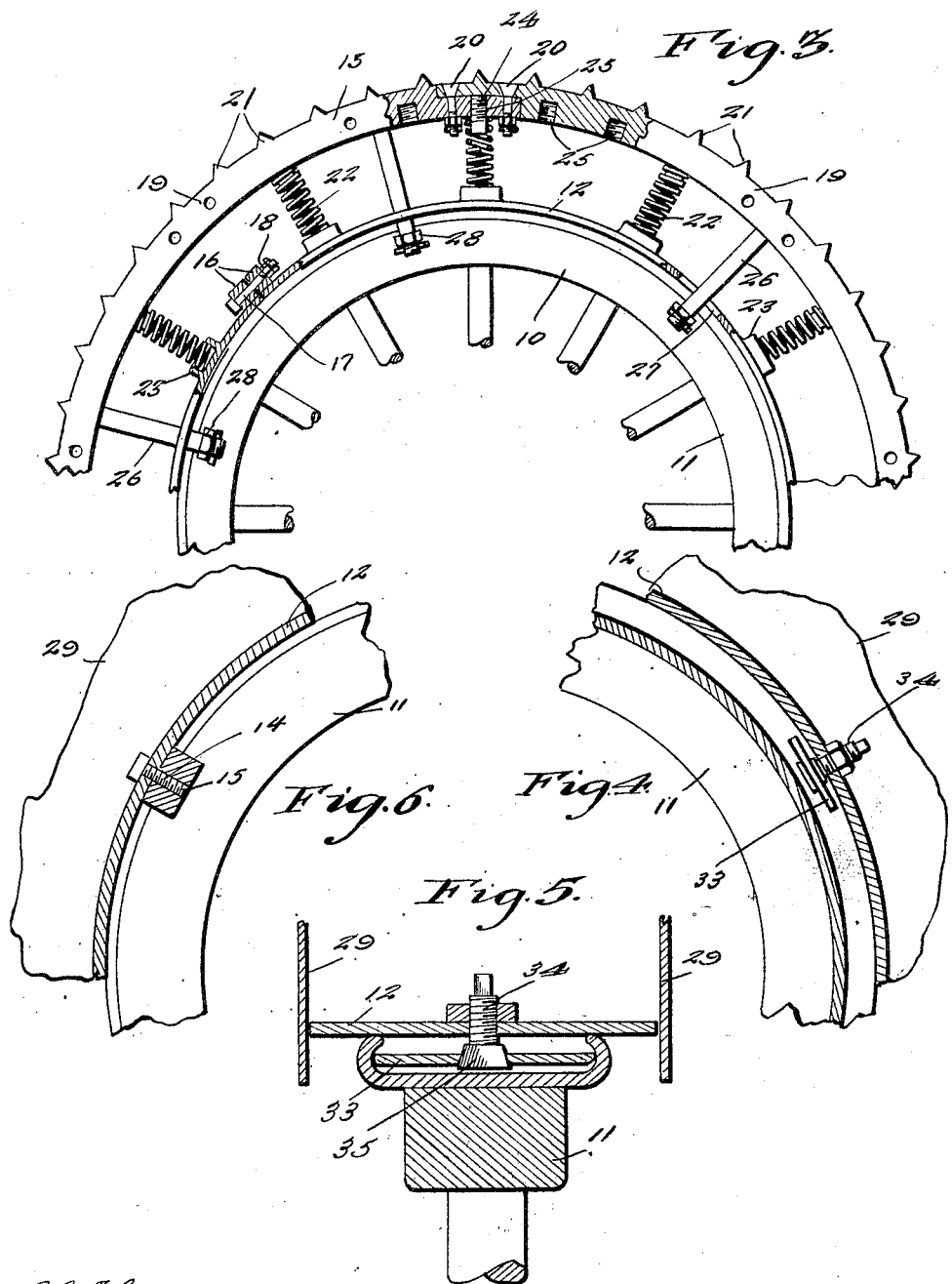

Patented June 12, 1923.

1,458,662

UNITED STATES PATENT OFFICE.

JOHN WALTER MILLER, OF KENSETT, ARKANSAS.

TIRE.

Application filed December 9, 1922. Serial No. 605,947.

*To all whom it may concern:*

Be it known that I, JOHN W. MILLER, a citizen of the United States, residing at Kensett, in the county of White and State of Arkansas, have invented new and useful Improvements in Tires, of which the following is a specification.

This invention relates to improvements in vehicle tires and has for an object the provision of an improved construction of resilient tire, which eliminates punctures and similar disadvantages experienced in the use of the ordinary pneumatic tire, without sacrificing any of the easy riding qualities of the pneumatic tire.

Another object of the invention is the provision of a resilient tire having means by which it may be attached to different types of wheel rims, such as clincher rims, straight side, or the usual wheel rim of an ordinary vehicle.

With the above and other objects in view, the invention further includes the following novel features and details of construction, to be hereinafter more fully described, illustrated in the accompanying drawings and pointed out in the appended claims.

In the drawings:—

Figure 3 is a side elevation with the protector plates removed.

Figure 4 is an enlarged fragmentary section at right angles to the axis of the wheel and showing the manner of attaching the tire to a clincher rim.

Figure 5 is an enlarged transverse section of the same.

Figure 6 is a view similar to Figure 4 illustrating means of attaching the tire to a different style of rim.

Figure 1:
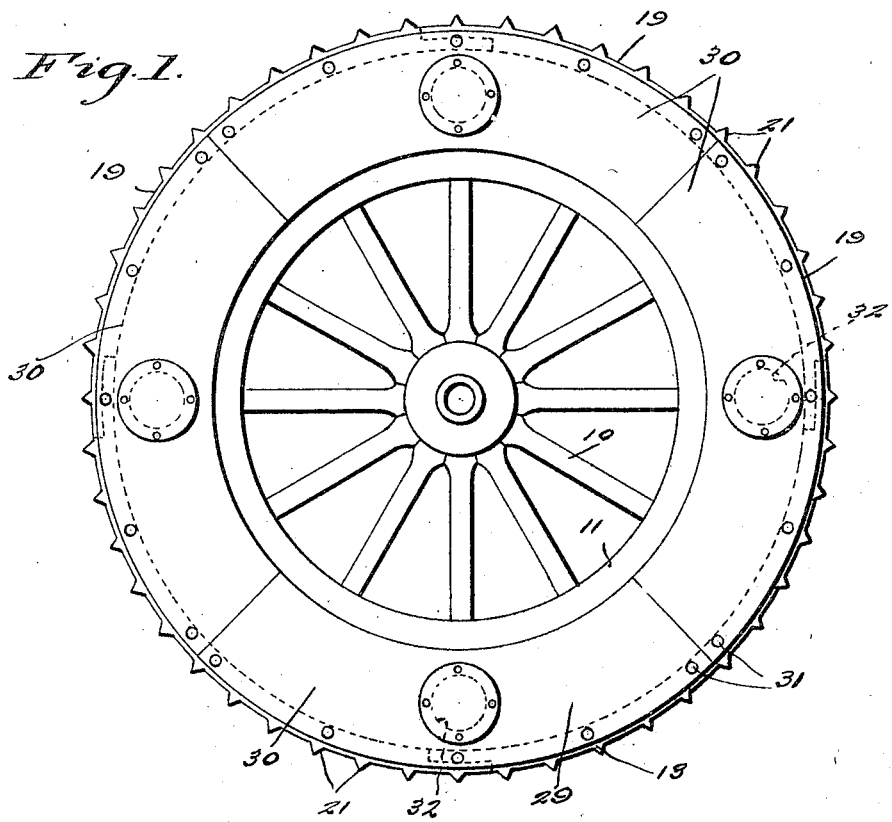
Figure 1 is a side elevation of a wheel with the improved tire applied thereto.
Figures 2, 7:
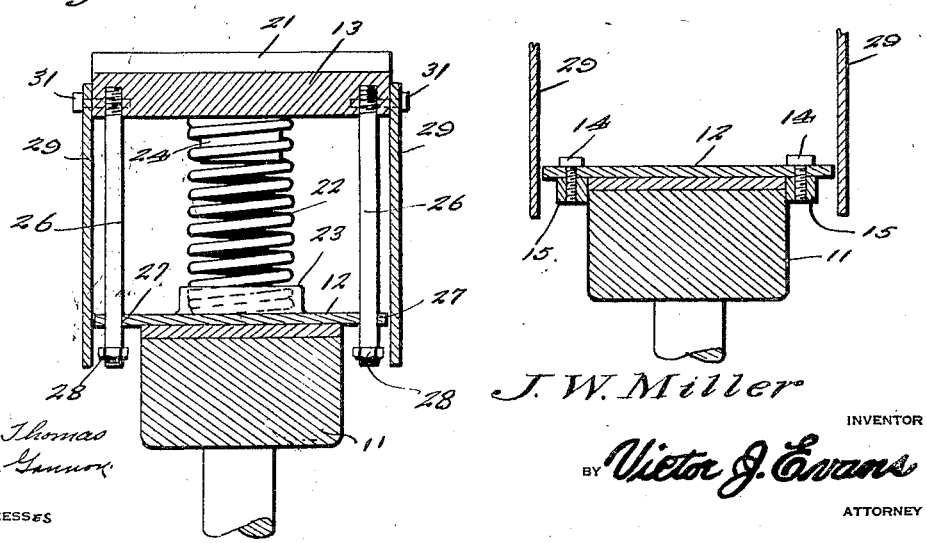
Figure 2 is a sectional view taken radially through the wheel and tire.
Figure 7 is a transverse sectional view of the same.

Referring to the drawings in detail, wherein like characters of reference denote corresponding parts, there is illustrated at 10 a wheel of a vehicle, having a rim 11.

The tire constituting the present invention and which is shown as attached to the wheel comprises an inner annular member 12 and an outer annular member 13, the former being shown as secured to the wheel by means of bolts 14 which pass through blocks 15 and through the member 12 for engagement with the wheel.

The member 12 is preferably formed of a single piece of material and is provided at its opposite ends with blocks 16 having openings therein which register when the ends of the member 12 abut, the said openings receiving a bolt 17 which serves to hold the ends together. The bolt is provided with a nut 18 and also with a cotter pin to prevent accidental removal of the nut.

The outer member 13 is preferably of sectional formation, the ends of each section being reduced as at 19 and arranged in overlapping relation, while a bolt 20 serves to secure the ends of the sections together. These bolts are also provided with nuts held in place by cotter pins. Each of the sections may be provided with transverse ribs 21 arranged upon their outer periphery or tread so as to provide traction means for the tire.

Positioned at suitable intervals between the inner member 12 and the outer members 13 are radially arranged springs 22, whose inner ends are seated within sockets 23 provided in the inner member 12 and whose outer ends receive studs 24 projecting inwardly from the outer member 13. These studs threadedly engage openings 25 spaced around the outer member 13 so that the number of springs used may be regulated in accordance with the duty of the tire. If desired, the openings 25 not receiving studs 24 may be closed by suitable plugs so as to prevent the passage of dirt or water.

Extending inwardly from and carried by the outer member 13 are spaced pairs of guide rods or bolts 26, whose inner ends extend through elongated openings 27 provided in the inner member 12, one rod of each pair being disposed upon opposite sides of the wheel 10. The inner ends of these rods are threaded for the reception of nuts 28 which serve to limit the relative movement of the inner and outer members in one direction.

Each side of the tire is provided with an annular closure ring 29 which is made up of a plurality of separate segmental sections 30 which are secured to the outer member 13 by means of fastening devices 31. Each of the sections is preferably provided with openings 32, whereby access may be had to the interior of the tire for purposes of adjustment.

As previously stated, the tire may be used in connection with wheels having different types of rim and in Figures 4 and 5 the tire is shown as applied to a clincher rim. For this purpose there are provided blocks 33 which are secured to the inner member and which engage the bead of the rim, the said blocks being held in place by bolts 34 having heads or buttons 35.

It will be apparent from the foregoing description and accompanying drawings that the invention provides a simple and reliable type of vehicle tire which will furnish a maximum amount of resiliency so as to insure easy riding and eliminate undue shocks and jars which might be carried to the vehicle structure or its operating mechanism, so that the life of the latter will be materially increased. In addition, the tire may be applied to any type of vehicle wheel now in use.

The invention is susceptible of various changes in its form, proportions and minor details of construction and the right is herein reserved to make such changes as properly fall within the scope of the appended claims.

Having described the invention what is claimd is:—

1. A resilient tire comprising spaced inner and outer annular members, means for securing the inner member upon the rim of a wheel, resilient elements spaced around and located between the inner and outer members to hold the same yieldingly spaced, the inner annular member having spaced elongated slots arranged in pairs with one slot of each pair disposed upon each side of the wheel and guide rods having their inner ends secured to the outer member and their inner ends passing through the elongated slots.

2. A resilient tire comprising an inner split member having apertured lugs secured to each end thereof, a fastening device extending through the apertures to hold the ends together and provide an annular member, an outer annular member, means for securing the inner member upon the rim of a wheel, resilient elements spaced around and located between the inner and outer members to hold the same yieldingly spaced, the inner annular member having spaced elongated slots arranged in pairs with one slot of each pair disposed upon each side of the wheel and guide rods having their outer ends secured to the outer member and their inner ends passing through the elongated slots.

3. A resilient tire comprising an inner annular member, an outer member, said outer member comprising a plurality of segmental sections, reduced extremities at each end of each section for overlapping engagement with an adjacent section, means for securing the sections together to provide an annular member, means for securing the inner member upon the rim of a wheel, resilient elements spaced around and located between the inner and outer members to hold the same yieldingly spaced, the inner annular member having spaced elongated slots arranged in pairs with one slot of each pair disposed upon each side of the wheel and guide rods having their outer ends secured to the outer member and their inner ends passing through the elongated slots.

In testimony whereof I affix my signature.

JOHN WALTER MILLER.